United States Patent [19]

Howard et al.

[11] 4,218,863
[45] Aug. 26, 1980

[54] CONTINUOUS MOTION WRAPPING MACHINE

[75] Inventors: Thomas B. Howard, Green Bay, Wis.; Christof Stary, Eckental, Fed. Rep. of Germany

[73] Assignee: American Can Company, Greenwich, Conn.

[21] Appl. No.: 962,949

[22] Filed: Nov. 22, 1978

[51] Int. Cl.³ .......................... B65B 9/06; B65B 9/10
[52] U.S. Cl. ...................................... 53/547; 53/550; 53/379; 198/377
[58] Field of Search ................. 53/547, 550, 373, 379, 53/378, 380, 411, 551, 554, 552, 389; 198/377, 378, 626; 83/647.5, 646

[56] References Cited

U.S. PATENT DOCUMENTS

| 245,331 | 8/1881 | Walker | 83/647.5 X |
|---|---|---|---|
| B 417,299 | 1/1975 | Brown, Jr. et al. | 53/547 X |
| 1,320,699 | 11/1919 | Leumann | 53/547 |
| 2,296,142 | 9/1942 | Campbell | 53/547 X |
| 2,391,719 | 12/1945 | Llewellyn | 83/646 X |
| 2,545,243 | 3/1951 | Rumsey, Jr. | 53/411 |
| 2,550,616 | 4/1951 | Stephano | 53/547 X |
| 2,584,060 | 1/1952 | Stephano | 53/547 X |
| 2,982,334 | 5/1961 | Cooper et al. | 53/551 X |
| 3,001,351 | 9/1961 | Brook et al. | 53/547 X |
| 3,011,934 | 12/1961 | Bursak | 53/554 X |
| 3,050,916 | 8/1962 | Gausman et al. | 53/552 |
| 3,110,142 | 11/1963 | Brook et al. | 53/547 |
| 3,133,390 | 5/1964 | Leasure et al. | 53/551 |
| 3,153,607 | 10/1964 | Ambler | 156/304 |
| 3,325,331 | 6/1966 | Schwanekamp et al. | 156/290 |
| 3,576,694 | 4/1971 | Greisman | 156/583.5 |
| 3,587,824 | 6/1971 | Rochia | 198/377 |
| 3,729,359 | 4/1973 | Monsees | 53/550 X |
| 3,844,088 | 10/1974 | McDonough et al. | 53/389 X |
| 4,054,474 | 10/1977 | Collins et al. | 156/86 |
| 4,084,999 | 4/1978 | Rucker | 156/583.9 X |

*Primary Examiner*—Horace M. Culver
*Attorney, Agent, or Firm*—Robert P. Auber; Paul R. Audet; George P. Ziehmer

[57] ABSTRACT

A synchronized wrapping machine which receives a series of articles to be wrapped and forms and heat seals a wrap of heat sealable material around each article. The incoming articles are longitudinally aligned and are thereafter conveyed in preselected spaced relation into a tube continuously formed of longitudinally overlapped heat sealable material, with the tube thereafter being heat sealed together and severed intermediate adjacent articles. The overwrapped articles are engaged by upper and lower article carrier holding cups and are transported longitudinally between upper and lower indexing conveyors which drive the article carriers. During traverse of the indexing conveyors, the overwrapped articles are turned 90° by the article carriers and the severed ends of the wrapping are tucked and folded before engagement with an end sealer which heat seals the ends together. The wrapping of the articles is thereby accomplished through the machine in substantially continuous motion with a minimum of speed limiting vibration.

25 Claims, 16 Drawing Figures

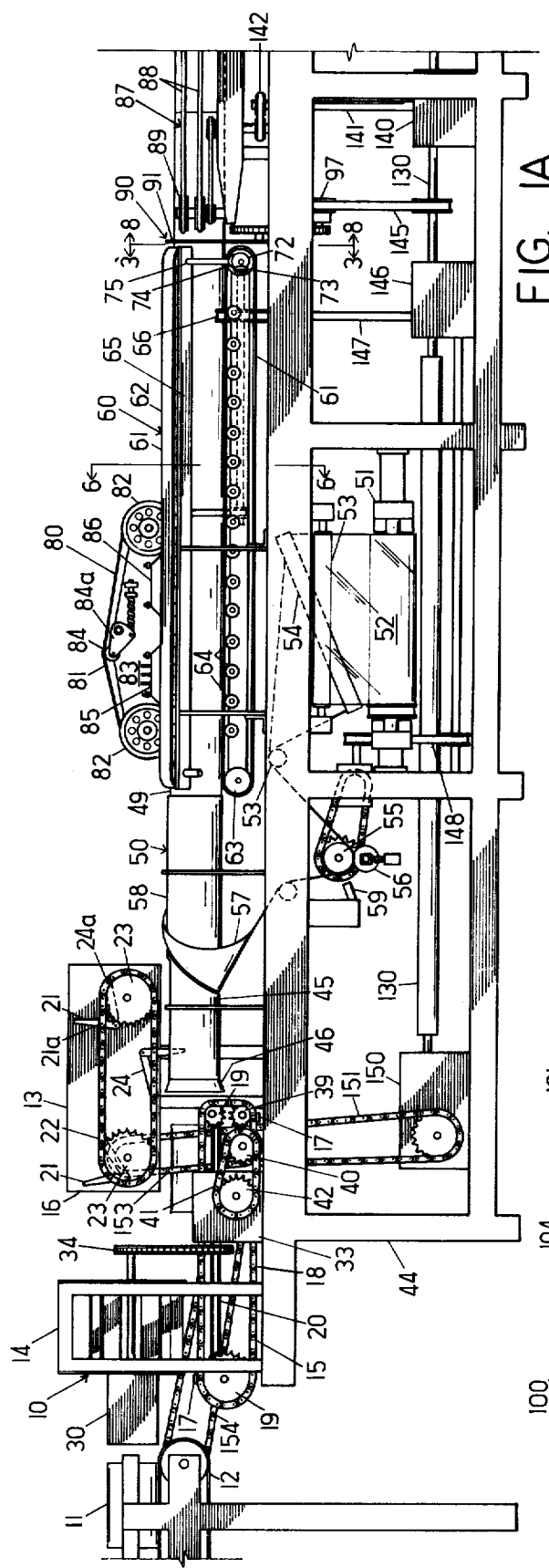
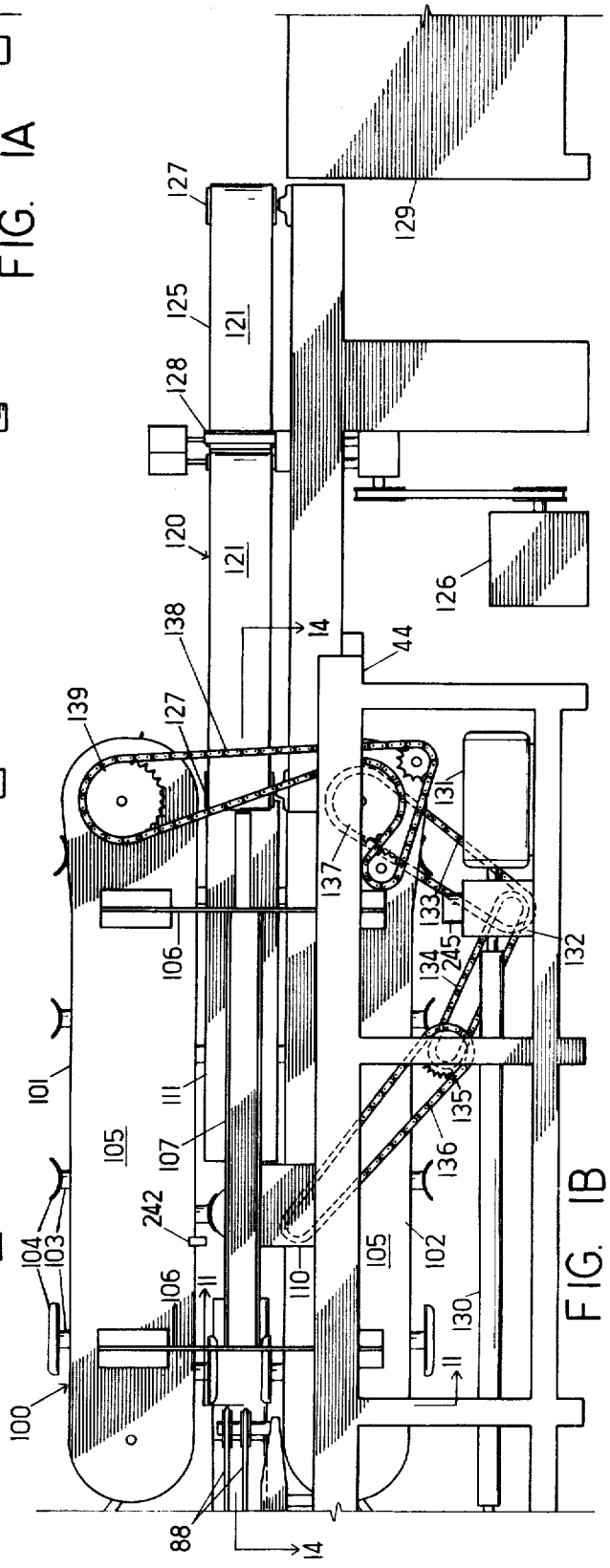
FIG. IA
FIG. IB

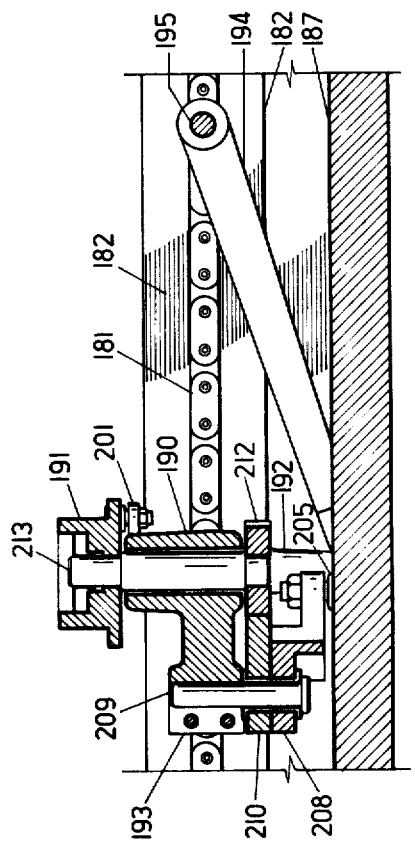
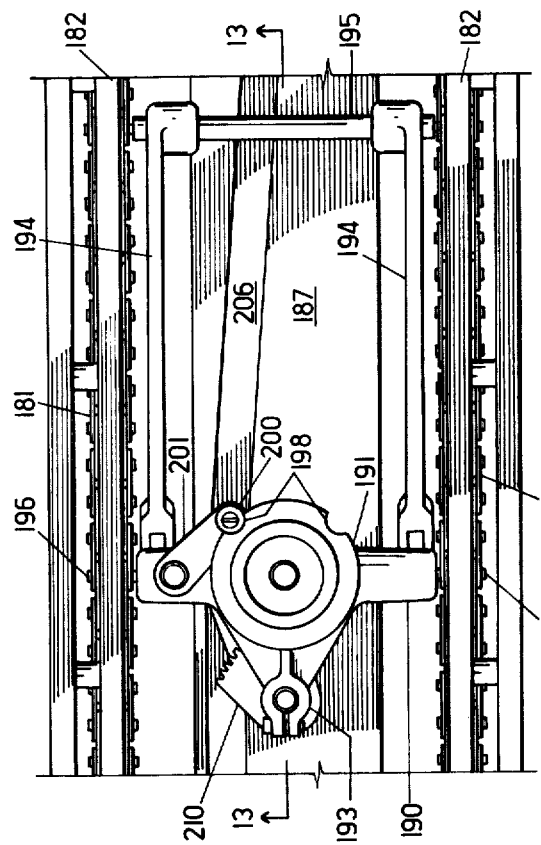
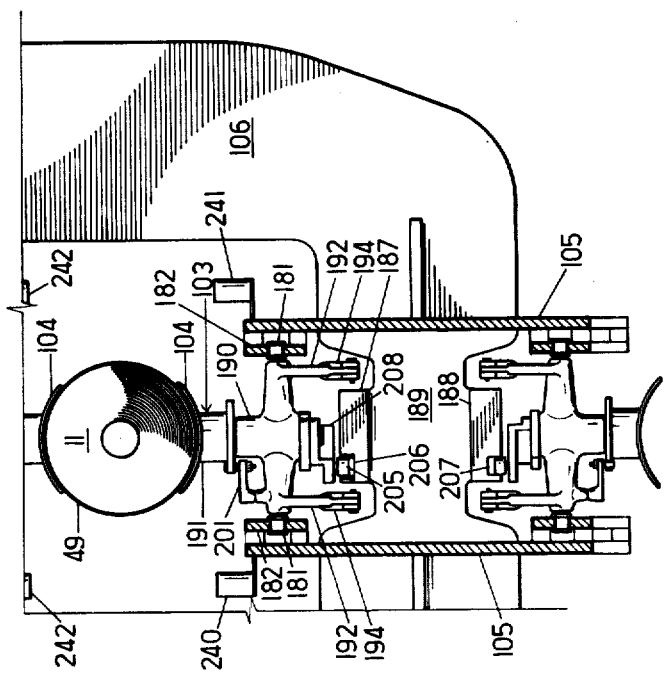

CONTINUOUS MOTION WRAPPING MACHINE

BACKGROUND OF THE INVENTION

1. Field of the Invention

This invention pertains generally to the field of wrapping machines and more particularly to machines adapted to receive articles and to form and close a wrapping of heat sealable material about the articles.

2. Description of the Prior Art

A variety of consumer articles are mass production wrapped in heat sealable wrapping material before being delivered to the customer. A common example is paper toweling rolls wrapped in polyethylene, in which the wrapper serves to hold the roll together and to protect it from moisture and abrasion. The heat seals on the wrappers for such paper toweling thus must be substantially moisture tight to perform adequately.

As is generally the case for products prepared for the consumer mass market, the cost per unit article is strongly dependent on the amount of time required for each operation, including packaging. The typical paper roll wrapping machine requires that the rolls be displaced from their direction of motion several times during the packaging operation to produce a sealed overwrap of heat sealable material around the roll, and then to fold and heat seal the ends of the packaging about the roll. The displacements and reciprocations of the roll within the machine limits the production speed because of the time that must be allocated to such motions. Additionally, the motions of the machine parts required to change the direction of motion of the articles invariably leads to shock and vibration which can become severe as machine speed is increased.

Known machines capable of forming sealed wrappers around articles are shown in U.S. Pat. Nos. 1,320,699; 2,296,142; 2,550,616; 2,584,060; 3,001,351; and 3,110,142. The production of sealed packages around articles with these machines generally requires speed limiting changes in the direction of motion of the articles.

Additional known patents which disclose the formation of a heat sealed wrapper about an article are U.S. Pat. Nos. 2,545,243; 2,982,334; 3,011,934; 3,050,916; 3,133,390; 3,153,607; 3,325,331; 3,576,694; 4,054,474; 4,084,999; and B417,299. In the typical mechanism for heat sealing polyethylene or other heat sealable material into a tube, a back-up die is usually required to hold the material firmly against the sealing die. The space occupied by the back-up die tends to inhibit formation of a tight wrap if the tube is formed around the articles being wrapped. Alternatively, if the tube is sealed before the articles are inserted, the additional steps involved increase the processing time.

SUMMARY OF THE INVENTION

The wrapping machine of the invention receives articles to be wrapped and forms and seals an overwrap on the articles in substantially continuous motion through the machine. The articles, such as rolls of paper toweling, are fed in longitudinally spaced relation into a tube formed of heat sealable material which is cut and sealed about the article in continuous forward motion with a single 90° rotation of the article to facilitate sealing of the ends of the wrapper. The continuous motion of the machine minimizes the shock and vibration associated with known machines of this type, and thereby allows much higher production speeds to be obtained. Further, the various operating parts of the machine are connected for synchronous operation with one another such that operation of the machine at several running speeds is possible.

The operating parts of the machine include a tube forming section which forms a web of heat sealable material, such as polyethylene, into a tube having overlapped longitudinal edges; and an article feeding section which receives the articles to be wrapped and feeds the same in longitudinal alignment and selected spaced relation into the tubular formed material. The tubular formed material with the articles spaced therein is then drawn from the tube forming section to a heat sealer which continuously forms a longitudinal heat seal between the overlapped edges of the material. A cut-off knife is operable to sever the sealed tubular overwrap midway between adjacent articles, which are then delivered to and transported forwardly by holding cups carried on indexing conveyors. During traverse of the indexing conveyors, the articles and their overwraps are rotated 90° such that the severed ends of the wrapping extend out transversely with respect to the direction of motion of the articles. A tucker arm and folding plow are mounted in position to engage the severed ends of the overwrap and to fold the same tightly to the ends of the article. A heat sealing conveyor then engages the folded ends and seals them to complete the wrapping.

The articles are displaced downwardly a single time in the article feeding section by a star wheel spacing device which moves in smooth unidirectional rotation with minimal vibration. Once properly spaced in longitudinal alignment, the articles remain moving in a straight line through the machine, which allows virtuely vibration free operation. The single 90° rotation of the articles in the indexing conveyor section is accomplished smoothly and without the need to displace the articles from their line of forward motion.

The heat sealer forms a continuous seal between the overlapped longitudinal edges of the tubular formed material by utilizing an endless heat sealing belt having perforations which allow for the passage of heated air therethrough. The belt is maintained in moving contact synchronous with the forward motion of the tubular material. A first air nozzle directs heated air at a first portion of the belt to tackify the heat sealable material, and a second nozzle directs cooling air at a second portion of the belt to cool the material beneath and set it. The drawing of the tubular formed material, with the article spaced within, exerts sufficient tension in a longitudinal direction on the heat sealable material to maintain the overlapped longitudinal edges of the tube in contact during the sealing operation. The light pressure of the moving sealing belt on the tubular material and the pressure of the heated air passing through the belt perforations is sufficient to maintain the overlapped edges in contact and to cause heat sealing of the same even in the areas of the tube between adjacent articles.

The severing of the tube after sealing is accomplished by a serrated knife blade having sharply pointed serrations which is passed rapidly through the moving tube approximately midway between adjacent articles. The knife blade itself is preferably mounted for motion synchronous with the forward motion of the web on a planetary gear which rotates about a fixed sun gear, in position such that the knife passes very rapidly through the area of the tubular material, but moves much more slowly through the remainder of its cyclic path.

Further objects, features and advantages of the invention will be apparent from the following detailed description taken in conjunction with the accompanying drawings.

BRIEF DESCRIPTION OF THE DRAWINGS

In the drawings:

FIGS. 1A and 1B are a side elevation view of the continuous motion wrapping machine with some parts broken away to illustrate the flow of articles through the machine.

FIG. 11 is a cross-sectional view of the indexing conveyors taken generally along the line 11—11 of FIG. 1B.

FIG. 12 is a top plan view of an article carrier mounted to the indexing conveyor with the holding cup portion of the article carrier removed for purposes of illustration.

FIG. 13 is a cross-sectional view of an article carrier taken along the line 13—13 of FIG. 12.

DESCRIPTION OF THE PREFERRED EMBODIMENT

Figure 2:
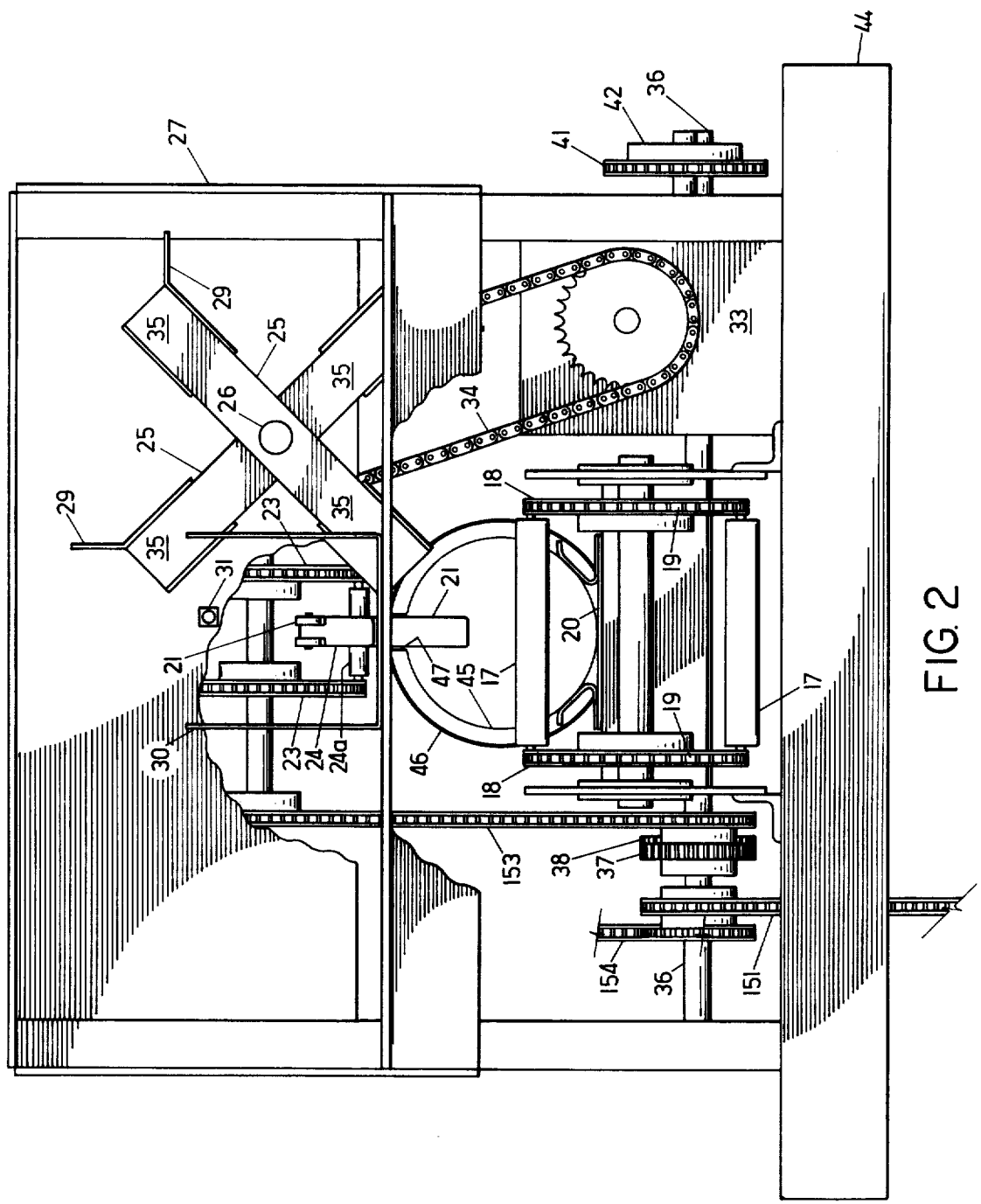
FIG. 2 is a front elevation view of the star-wheel spacer portion of the machine with some parts of the star-wheel spacer broken away for illustrative purposes.

Referring to the drawings, wherein like numerals refer to like parts in each view, an overall side elevation view of the continuous motion wrapping machine is shown generally at 10 in FIGS. 1A and 1B, wherein the view of FIG. 1B is a continuation of the machine shown in FIG. 1A. The operation of this machine will be described with regard to the packaging of rolls of paper toweling in wraps of polyethylene, although it is understood that other articles having different shapes and sizes may be wrapped with other types of heat sealable material.

The rolls of unwrapped paper toweling 11 are delivered to the machine on a standard in-feed conveyor belt assembly 12. The rolls received from the conveyor 12 are delivered to the article feeding section 13 of the machine which arranges the rolls to be wrapped in longitudinal alignment and selected spaced relation to one another. The article feeding section includes a star wheel spacer 14, a spacing conveyor 15 which receives articles from the star wheel spacer, and a timing conveyor 16. The star wheel spacer 14 is adapted to receive the rolls one at a time and to drop each one individually down to the spacing conveyor 15.

The spacing conveyor 15 has a series of transversely disposed bars 17 attached at either end to a pair of chain belts 18 which are driven about idler sprockets 19 and drive sprockets 39 located at the ends of the conveyor. The rolls dropped by the star wheel spacer are received on a slide tray 20 and are engaged by one of the bars 17 and moved longitudinally (in a direction along the length of the machine) in selected spaced relation to a position where they can be engaged by a pusher lug 21 of the timing conveyor 16. The lugs 21 are pivotally mounted by a rod 21a between a pair of endless chains 22 which ride around pairs of sprockets 23 at either end of the conveyor. A registration arm 24 is pivotally mounted by a rod 24a to the chain belts 22 and is pivotally mounted at its other end to the end of the pusher lug 21. The mounting of the registration arm to the lug allows the lug to extend directly outward from the chain belts during the linear portion of its travel but causes the lug to be oriented backwardly from its direction of travel as it passes around the sprockets 23 so that the lug smoothly engages the back end of a roll passing from the spacing conveyor 15.

The star wheel spacer portion of the machine is best shown in the front end elevation view of FIG. 2. The spacer consists of four flange blocks 25 diagonally mounted to a central shaft 26 which is itself mounted for rotation to a frame enclosure 27. The roll is pushed by the in-feed conveyor 12 onto and through a U-shaped guide pan 30 and onto a canted flange 29, which is mounted to and extends outwardly from the flange blocks, until the front end of the roll contacts a limit switch 31. Closure of the switch 31 activates engagement of solenoid operated gearing in a commercially available gear box 33 to drive a drive chain 34 which rotates the shaft 26 a quarter turn to drop the roll downwardly to the slide tray 20 of the spacing conveyor 15. During the time that the roll is being dropped to the spacing conveyor, rolls coming off of the in-feed conveyor are blocked by the flat faces 35 of the flange blocks 25. Upon sufficient rotation of the star wheel flange blocks, the faces 35 will clear the opening and allow another roll to be pushed in. The motion of the rotating star wheel and the spacing conveyor 15 are coordinated so that each roll dropped by the star wheel is in a position between the pusher bars 17 and, when engaged by a pusher bar, will be a set distance from the roll that lies ahead of it on the spacing conveyor.

The spacing conveyor 15 is driven off power supplied from a driveshaft 36 transmitted through a gear 37 mounted on the driveshaft to a meshed gear 38 (partially shown in FIG. 2) which is itself mounted to and rotates the lower drive sprockets 39. The driveshaft 36 extends to the opposite side of the machine wherein it is connected to synchronously deliver power through a sprocket 40, chain 41, and a sprocket 42 to the gear box 33.

As shown in FIGS. 1A, 1B, and 2, the star wheel spacer and spacing conveyor are mounted on a machine frame 44 which extends the length of the machine.

Referring again to FIG. 1A, a paper roll passing from the spacing conveyor is advanced by the lug 21 through a guide tube 45 and passes into the tube wrapper forming section 50 of the machine. The guide tube has a flared centering flange 46 surrounding the opening of the tube, and as best shown in FIG. 2, the top of the tube is split by a slot 47 which enables passage of the pusher lugs 21 through the tube.

The wrapper forming section 50 includes a film receiving section 51 adapted to receive a roll 52 of heat sealable material such as polyethylene and to feed the web upwardly through a series of tensioning rollers 53, around a canted roller 54 (shown in phantom lines in FIG. 1A) which changes the direction of the web by 90°, between a drive roller 55 and spring biased backup roller 56, to a tube forming collar 57. The web of heat sealable material received by the collar 57 is inverted and folded into an open tube-like form 49 having overlapped longitudinal edges as it is drawn through the substantially circular forming tube 58 which receives the web from the forming collar 57. It may be noted that once a roll is pushed into the tube of heat sealable material by the pusher lug 21, it will be carried along with the tube as the tube is drawn through the machine. The construction of the forming collar and forming tube are standard and are well known to those skilled in packaging technology. Since the typical wrapper will have printed material thereon, an electric eye 59 monitors printed indicia on the moving web so as to compare the position of the web with the incoming rolls of paper and advance or retard the drive roller 55 to keep the printed heat sealable material in register with the incoming rolls of paper.

The formed tube with the articles therein is drawn into the heat sealing section 60 of the machine by three drawing conveyors 61 which are spaced uniformly about the periphery of the formed tube of heat sealable material. Each of the drawing conveyors 61 has an endless friction belt 62 mounted at either end by pulleys 63, and supported against the sides of the tube by a series of idler rollers 64 which are rotatably mounted to the drawing conveyor mounting plate 65, to which the end pulleys 63 are also rotatably mounted. Each of the friction belts 62 is composed of a flexible material having relatively good surface friction with respect to polyethylene, such as a fabric backed rubber belt or certain flexible plastic belts. The pressure between the rollers 64 pressing the formed tubular web 49 between the friction belt 62 and the roll within the tube causes the tubular web to be forceably drawn from the tube forming section. The contact between the belts 62 and the tubular web also maintains the web relatively taut and closely drawn around the articles within. This occurs because the friction belts apply longitudinal tension about the periphery of the tubular formed material which pulls the material tight against the articles within, and also tends to hold the overlapped edge portions together even in the unsupported area between adjacent articles.

Figure 3:
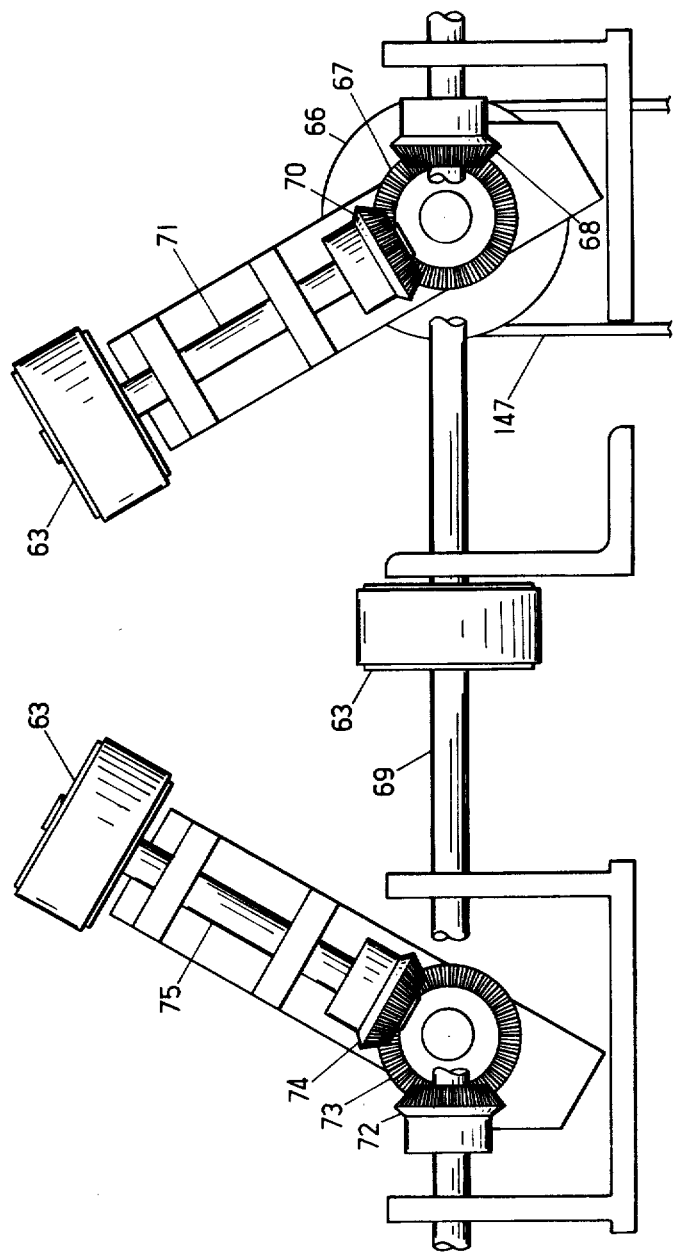
FIG. 3 is a partial cross-sectional view of the machine taken along the line 3—3 of FIG. 1A, showing an end elevational view of the drive mechanism for the drawing conveyors.

As best shown in FIG. 3, the drawing conveyors are driven in synchrony with the remainder of the machine by power supplied from a pulley 66 attached to a bevel gear 67, which is meshed with a second bevel gear 68 mounted to a rotatable driveshaft 69. The bevel gear 67 is also meshed with a third bevel gear 70 mounted to a rotatably mounted drive rod 71 which is attached to and rotates an end pulley 63 on one of the upper drawing conveyors. The driveshaft 69 is directly connected to and rotates the end pulley 63 on the lowermost drawing conveyor. The driveshaft 69 terminates in a bevel gear 72 which is meshed with an idler bevel gear 73. The idler gear 73 is meshed with another bevel gear 74 attached to a rotatably mounted drive rod 75, which rotates the end pulley 63 on the other of the upper drawing conveyors.

The heat sealing section 60 also includes a heat sealer 80 having a perforated flexible endless heat sealing belt 81 which moves about pulleys 82 mounted for rotation at opposite ends of a belt carriage plate 83. A spring biased tensioning roller 84 mounted to a rotatable arm 84a applies pressure to the top portion of the belt to keep the belt taut, and a linearly disposed heat sealing portion of the belt is defined between the bottom tangents of the two pulleys 82. Hot air is applied at a first position along the linearly disposed portion of the belt by a hot air nozzle 85, while cool air is applied to the belt at a second position by a cooling air nozzle 86. The position of the cooling air nozzle 86 is spaced from the hot air nozzle in the direction of formed tube travel such that after the heat sealable material has been heated to sealing temperatures by the hot air from the nozzle 85, the air from the nozzle 86 will cool the heat sealable material to set the seal. The belt 81 is driven to move synchronously with the forward motion of the tubular web so that the position of a point on a belt is always constant with the underlying overlapped portions of the formed tube. A heat seal is thereby continuously formed between the overlapped portions of the formed tube including the portions of the tube which are between the paper rolls.

The paper rolls and the now sealed overwrapped tube surrounding them pass from the drawing conveyors to a transfer conveyor 87 which includes four endless rubber ring belts 88, supported by end pulleys 89, which engage the sides of the overwrapped roll. A cut-off knife assembly 90 is located between the drawing conveyors and the transfer conveyor. The cut-off assembly includes a moving cut-off knife 91 which periodically passes across the sealed tubular material in synchronism with the rate at which articles are supplied so as to sever the sealed tube substantially midway between adjacent rolls.

The rolls having the severed tubular overwrap around them are then transferred by the transfer conveyor to an indexing conveyor assembly 100 shown in FIG. 1B. The indexing conveyor assembly includes an upper indexing conveyor 101 and a lower indexing conveyor 102 spaced apart to define a linear longitudinal path through which the overwrapped articles can be transported. Each of the indexing conveyors carries article carriers 103 mounted to move about the periphery of the conveyors. The article carriers each have a holding cup 104 adapted to engage a portion of the periphery of the overwrapped roll and to hold the roll between them when supported along the linear portion of the travel of the article carriers between the upper and lower conveyors. The article carriers on the upper and lower conveyors move in synchrony with each other and descend downwardly until they are in registry adjacent to one another engaging the periphery of an overwrapped roll delivered by the transfer conveyor. As the article carriers traverse the length of the indexing conveyors, they are turned such that the rolls are rotated 90° from a longitudinal orientation to a transverse orientation. The rotation of the articles leaves the open severed ends of the tubular wrap extending out sideways such that they can be engaged by a tucking mechanism 110 mounted on either side of the indexing conveyor. The cut ends are tucked by the mechanism 110 and are folded by sliding against a folding plow 111 and maintained in folded position until the article is delivered to a heat sealing conveyor 120. The heat sealing conveyor is of standard construction and has a pair of transversely opposed endless heat conductive belts 121 which engage the closed ends of the wrapping material and are heated above the sealing temperature of the material in a heating section 122 by electric heating elements (not shown in FIG. 1B). The heated wrapped articles are then passed to a setting section 125 of the conveyor in which the belts 121 are cooled to set the seal on the ends of the wrappers. The heat sealing belts are preferably driven at constant speed by an electric motor 126 connected to rotate drive rollers 128 in frictional contact with the sealing belts 121. The completed wrapped articles may be delivered from the heat sealing conveyor 120 to other transfer conveyors (not shown) or may simply be discharged into a storage bin shown illustratively at 129.

The operations of the various components of the machine are driven and synchronized by common power take-off from a drive shaft 130 which runs the length of the machine. The shaft 130 is driven by a speed controlled direct current electric motor 131. The shaft 130 passes through a commercially available differential gear box 132 which is connected to deliver power from the drive shaft to a power output shaft (shown in dashed lines in FIG. 1B) which drives the indexing conveyors through a chain 133 and the tucking mechanism 110 through a drive chain 134, sprocket 135 and chain 136. The chain 133 directly drives a sprocket 137 on the lower indexing conveyor which is engaged through a drive chain 138 to a sprocket 139 on the upper indexing conveyor.

Power is delivered from the driveshaft 130 to a gear box 140 which turns an upright shaft 141 which in turn is connected by pulleys and drive belts 142 to the transfer conveyor end pulleys 89.

Similarly, power is delivered from the driveshaft 130 through a pulley belt 145 to the cut-off knife assembly 90. Another gear box 146 transfers power from the shaft 130 through a pulley belt 147 to the pulley 66 which drives the heat sealer 80 and drawing conveyors 61.

A drive belt 148 delivers power from the gearbox 146 to the film feed unit 51 to turn the drive roller 55.

The driveshaft 130 terminates in a gear box 150 which supplies power through a drive chain 151 to the driveshaft 36. A drive chain 153 supplies power from the shaft 36 to the timing conveyor 13, and a drive chain 154 is connected to deliver power from the shaft 36 to the in-feed conveyor 12.

The connection of all of the aforementioned operating units to a common power source insures that all of the components of the machine operate in synchrony at all machine operating speeds. The speed of operation of the machine may be adjusted by changing the output speed of the motor 131 using a commercially available SCR motor controller (not shown). The operation of the heat sealing belts 121 need not be precisely synchronized to the remainder of the machine as long as the speed thereof is sufficient to remove the wrapped articles from the indexing conveyors without interfering with their operation.

It will be noted from the above description that the wrapping and sealing of the article within the machine takes place in a substantially linear longitudinal manner with only a single downward displacement in the article feeding section, and a single 90° rotation of each article as it passes through the indexing conveyor in order to present the articles in position to have the ends tucked, folded, and sealed.

HEAT SEALER OPERATION

Figure 4:
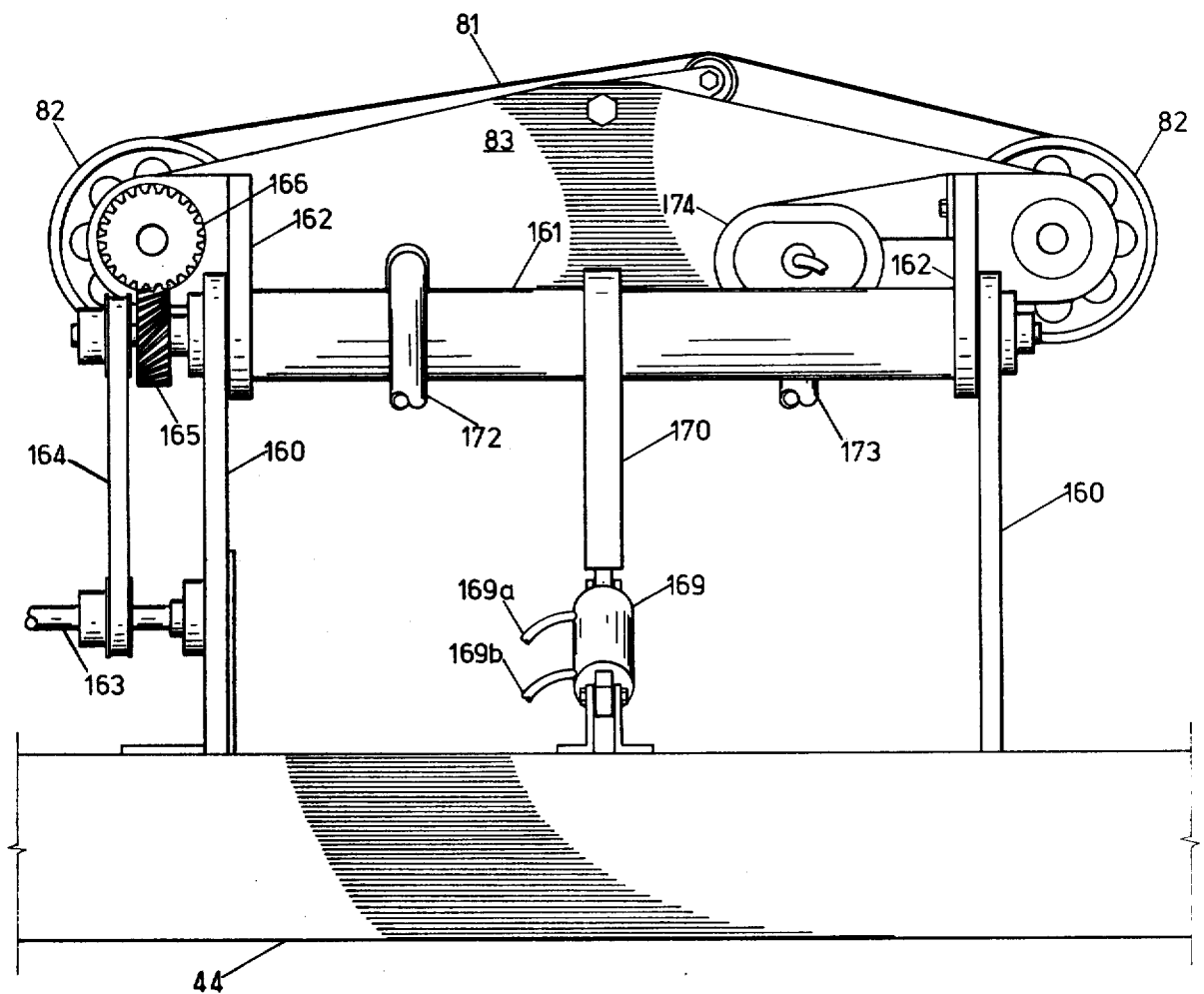
FIG. 4 is a rear elevation view of the heat sealer portion of the machine.

The operation of the heat sealer is best illustrated with reference to the detailed views of FIGS. 4-7. With particular reference to FIGS. 4 and 6, the heat sealer is mounted on the machine frame 44 by a pair of mounting posts 160. A shaft 161 is journaled between the two posts 160 and is itself attached by a pair of mounting arms 162 to the heat sealer carriage plate 83. The pulleys 82 which carry the heat sealing belt 81 are driven off of a power shaft 163 by a pulley belt 164 and a pair of gears 165 and 166 which are enmeshed at right angles to one another. The power shaft is connected for rotation to the pulley 66. As best shown in FIG. 6, the gear 166 is mounted to the end of a driveshaft 168 which is directly coupled to one of the pulleys 82 to drive it and the sealing belt 81.

The heat sealer can be driven toward or away from the tube 49 of heat sealable material by operation of a pneumatic cylinder 169 pivotally attached to the frame 44 and to a drive arm 170 which is attached to the shaft 161. Air under pressure may be supplied through a solenoid operated valve (not shown) activated by shut down of the machine to supply air under pressure to the input line 169b to drive the belt carriage upwardly from the heat sealable material. When operation begins again, the air pressure may be released from the line 169b to allow the carriage to resume its position shown in FIG. 6 such that the belt carriage is held by the retracted cylinder 169 with the sealing belt 81 applying moderate pressure on the tube 49.

Figure 7:
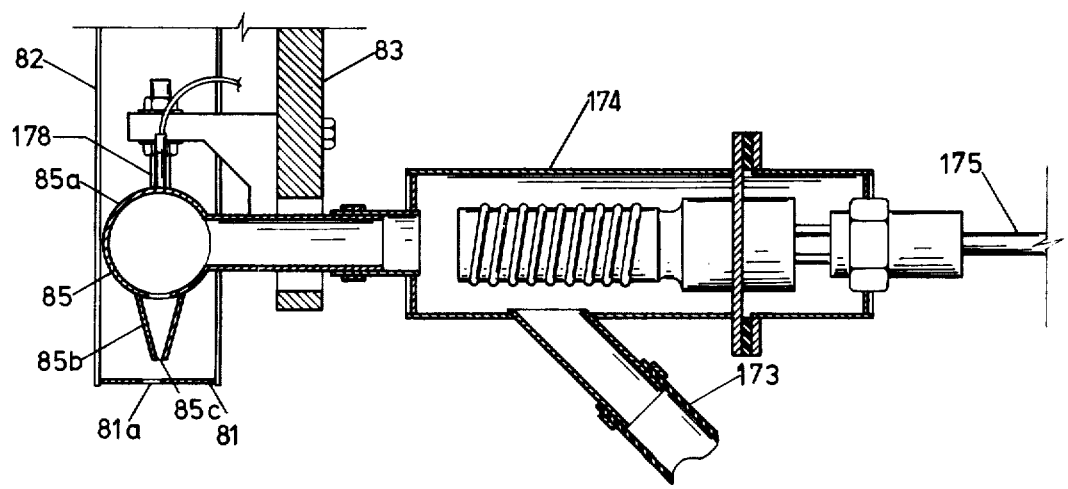
FIG. 7 is a cross-sectional view of a portion of the heat sealer taken along the line 7—7 of FIG. 5.

Air under pressure is directed through an air hose 172 directly to the cooling air nozzle 86. A second air pressure supply hose 173 delivers air under pressure through an electrical air heater 174 which then directs the air to the hot air nozzle 85. As shown in FIG. 7, the air heater is preferably of the electrical resistance heating type, being supplied through a standard electrical supply cord 175 with electric power as desired. It is apparent that the temperature of the air may be varied by varying the electric power supplied to the resistance type air heater to accommodate changes in the speed of operation of the machine, or by varying the air pressure and volume of air through the air heater.

Figure 5:
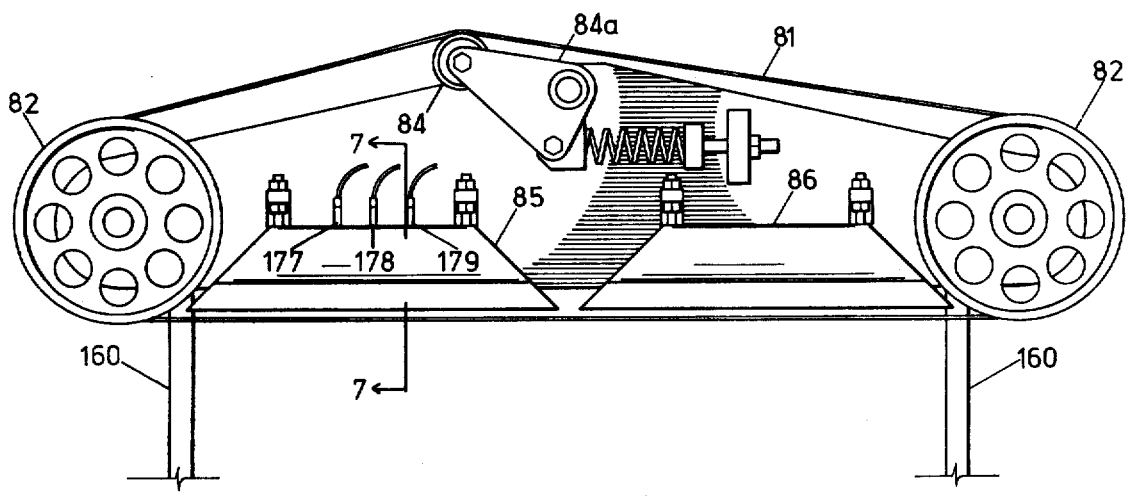
FIG. 5 is a front elevation view of the heat sealer portion of the machine.
Figure 6:
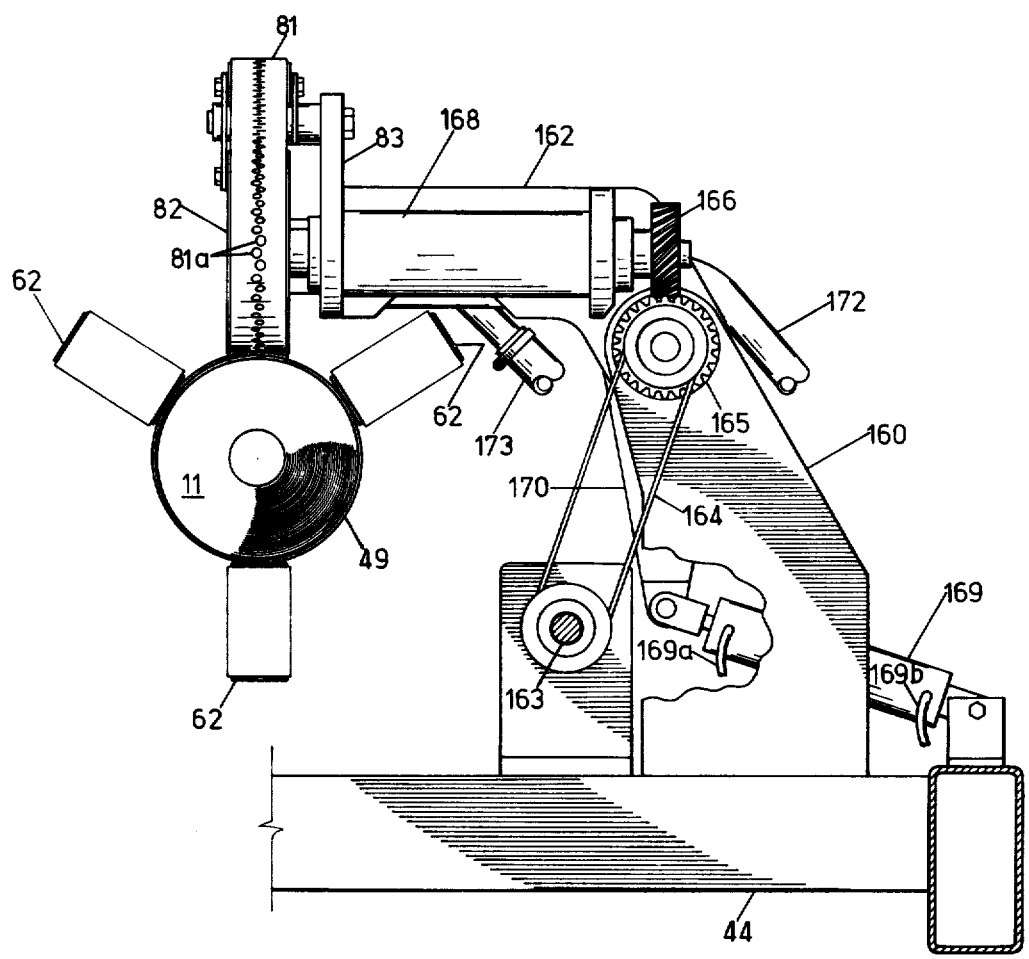
FIG. 6 is a partial cross-sectional view of the machine taken along the line 6—6 of FIG. 1A which particularly shows the heat sealer portion of the machine.

As illustrated in FIG. 5 and in the cross-sectional view of FIG. 7, a plurality of solenoid operated valves 177, 178, and 179 may be mounted on the nozzle 85 in communication with the interior body of the nozzle. The purpose of the three aforementioned valves is to allow a selected release of heated air from the nozzle 85 so as to prevent this air from being directed to the heat sealing belt 81. The solenoid operated valves are electrically connected to the controls for the machine such that a selected number of the valves will operate during different speeds of the machine. For example, at the slowest speed of the machine, all three of the valves may be opened, while for higher speeds the valves will be selectively closed one at a time until for the highest speed none of the valves would be opened.

The cross-sectional view of FIG. 7 illustrates the construction of the air nozzles, particularly illustrating the hot air nozzle 85. Each nozzle has a generally cylindrical body 85a and a V-shaped portion 85b which terminates in a long narrow slot 85c directly above the heat sealing belt 81. The slot is in position to direct air at perforations 81a which are distributed throughout the length of the belt, as shown in FIG. 6. These peforations allow the heated air emanating from the nozzle to make direct contact with the heat sealable material underneath and to thereby provide enhanced heating over that obtainable by a solid heat sealing belt alone. The belt 81 itself is preferably formed of flexible stainless steel having a Teflon (Dupont name for tetrafluoroethylene polymer) coating on the outside surface thereof which makes contact with the heat sealable material. The Teflon coating inhibits sticking of the heat sealable material to the belt.

As shown in FIG. 6, the friction belts 62 which draw the tubular formed material from the tube forming section cooperate with the heat sealer to produce a satisfactory heat seal on the tubular formed material, even in the areas of the tube in which the overlapped edges of the material are not supported by a roll. This result is achieved because the longitudinal tension applied by the friction belts 62 maintains the formed tubular material 49 fairly taut such that the overlapped longitudinal edges of the material are held together. The pressure applied by the heat sealing belt 81 and particularly the air flowing through the perforations 81a further serves to keep the overlapped edges held together. Good heat seals have been obtained in this manner on such heat sealable materials as polyethylene which ordinarily are difficult to heat seal in tubular form without the aid of a back-up die. Of course, the heat sealer 80 may also be utilized with a conventional stationary or moving back-up die for other heat sealing as for example, the formation of heat sealed bags.

CUT-OFF KNIFE OPERATION

Figure 9:
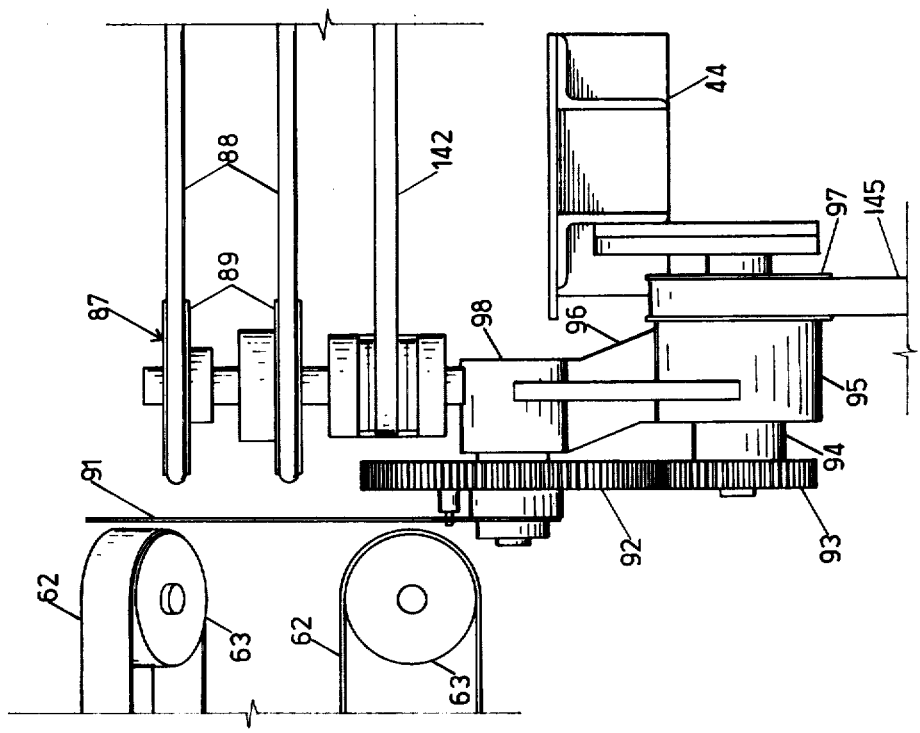
FIG. 9 is a side elevation view of the cut-off knife assembly of FIG. 8.
Figure 8:
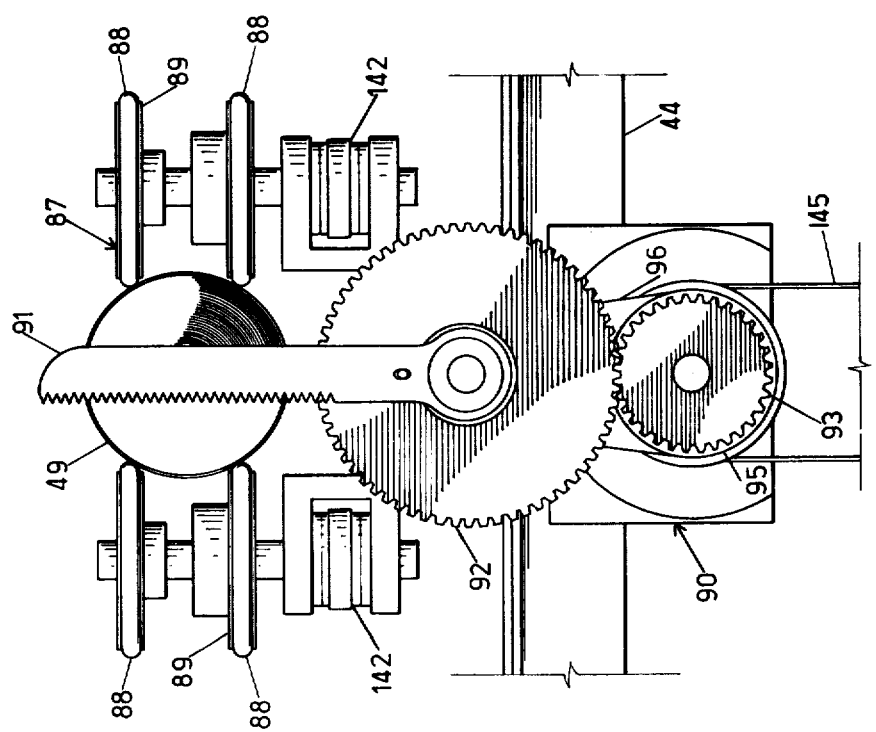
FIG. 8 is a partial cross-sectional view of the machine taken along the line 8—8 of FIG. 1A showing a front elevation view of the cut-off knife assembly.

The detailed construction of the cut-off knife assembly 90 is best shown in the detailed views of FIGS. 8 and 9. Referring to FIG. 8, the cut-off knife 91 itself is rigidly attached to and rotates with a planetary gear 92. The planetary gear 92 is enmeshed with and rotates about a smaller diameter stationary sun gear 93. The relationship between the diameters of the planetary gear 92 and sun gear 93 are chosen such that the planetary gear makes one complete rotation of itself while completing two revolutions of the sun gear. The maximum extended position of the cutting knife 91 from the sun gear is shown in FIG. 8 and is directly up through the middle of the normal position of the sealed tubular material 49. In this orientation, the cut-off knife 91 will have its greatest velocity. During the other portions of its travel, the cutting knife will be traveling relatively slowly, and during the period of time that it is returning to its upper-most position, another enwrapped roll will be advancing into the transfer conveyor 82. The rotation of the gears 93 and 92, and thereby the point in time at which the knife 91 crosses the path of the tubular web, is synchronized with the passage of the enwrapped rolls so that the knife cuts rapidly through the web at a position midway between adjacent rolls.

The knife blade 91 itself has a serrated cutting edge composed of a series of sharp pointed teeth. The sharp points on the teeth of the blade easily pierce the formed tubular material as they contact it, passing rapidly through the unsupported tube in a cut substantially perpendicular to the longitudinal direction of travel of the tube.

The mounting of the knife blade 91 and the gears 92 and 93 is best shown with reference to the side elevation view of FIG. 9. The stationary gear 93 is rigidly mounted to a hub 94. A collar 95 with a support arm 96 attached thereto rotates about the hub 94. The collar 95 is driven by a pulley 97 which is driven off the main power shaft 130 by the pulley belt 145. Another collar 98 is attached to the end of the arm 96 and is journaled to the planetary gear 92 to rotate the same about the sun gear.

INDEXING CONVEYOR OPERATION

Figure 10:
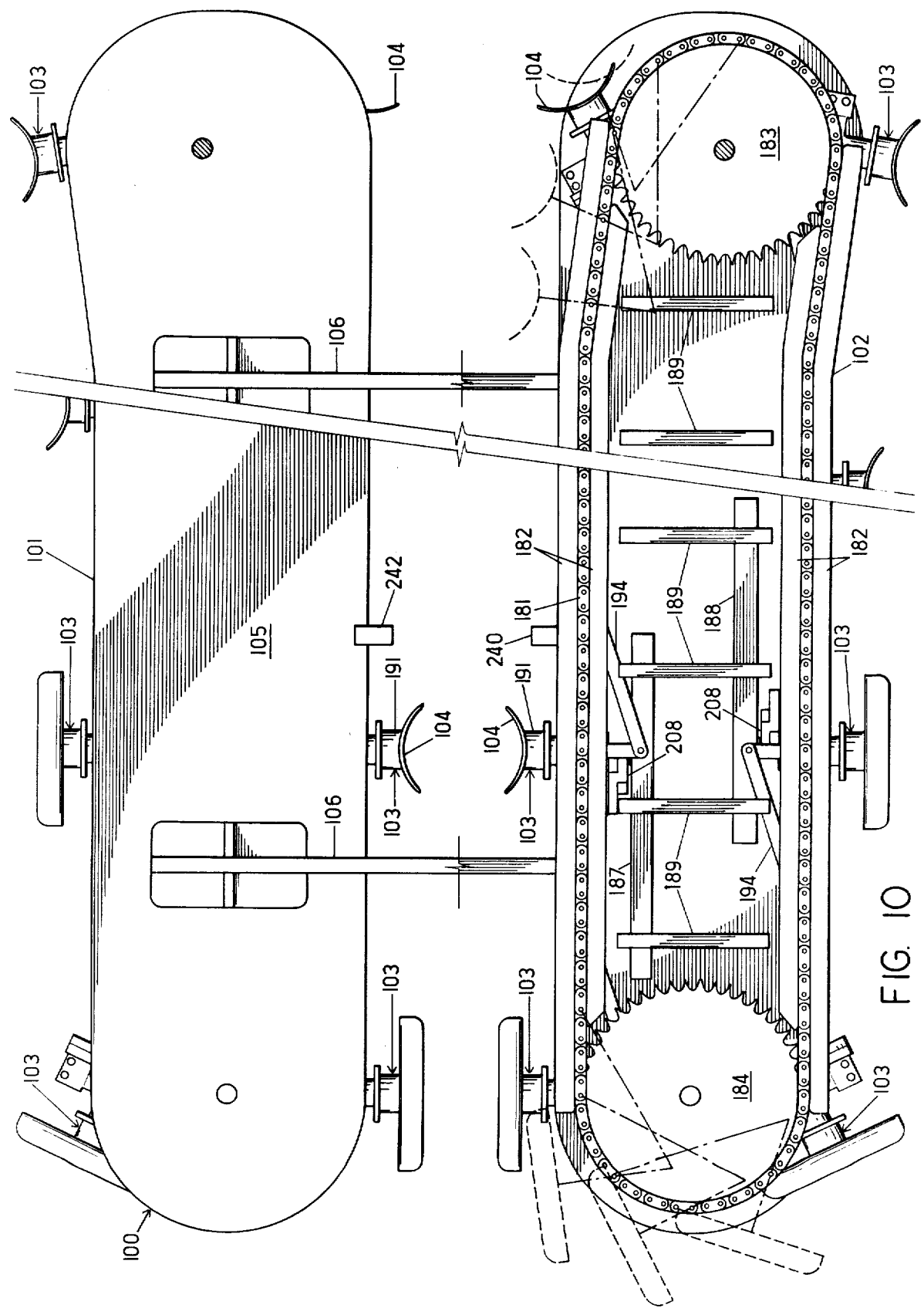
FIG. 10 is a side elevation view of the indexing conveyors of the machine, showing portions of the lower indexing conveyor broken away for purposes of illustration.

With reference to FIG. 10, the upper and lower indexing conveyors 101 and 102 are shown in somewhat greater detail. Each of the two conveyors has a frame plate 105 on the outer side of the conveyor to which a pair of mounting frames 106 are firmly attached. The mounting frames 106 extend downwardly to firm attachment to the frame 44 of the machine and are attached to a longitudinal reinforcing bar 107. For purposes of illustration, the frame plate and mounting frame members have been removed from the view of the lower conveyor 102 shown in FIG. 10 to illustrate the internal parts of the conveyor. It will be understood that the description of the lower conveyor 102 applies in its entirety to the construction of the upper conveyor 101.

Each article carrier 103 is supported for motion about the indexing conveyors by being mounted to a pair of roller chains 181 spaced laterally apart and guided by chain guides 182 on the upper and lower portions of the conveyor, each chain being turned around a drive sprocket 183 and an idler sprocket 184 both of which are mounted for rotation to the mounting frames 105. The drive sprocket is mounted to and rotates with the driven sprocket 137 on the exterior of the lower indexing conveyor.

For the reasons explained in greater detail below, a left hand index cam 187 and a right hand index cam 188 are mounted to frame spacers 189 in positions below the travel of the article carriers around the index conveyors. The frame spacers 189 are themselves fastened between the frame plates 105. The arrangement of the parts is also shown in the cross-sectional view of FIG. 11 which best illustrates the spacing of the frame plates 105 by the frame spacers 189.

As shown in FIG. 11, the article carriers 103 each include a cast carrier body 190 to which the hub 191 of the holding cup 104 is rotatably mounted. The body 190 of the article carriers includes a pair of downwardly extending guide brackets 192 which are each pinioned for rotation to guide arms 194 which are themselves rotatably connected to a guide rod 195, as best shown in FIG. 12. The guide rods 195 extend between and are mounted to the roller chains 181. As shown in FIG. 12, the carrier body 190 is itself attached by pins 196 for rotation to the two roller chains 181. The extending guide arm 194 coupled to the guide bracket portion 192 of the carrier body maintains the carriers in a position extending substantially perpendicularly outward from the roller chains 181 when the article carriers are traversing the linear portions of the travel of the roller chains. The guide arm 194 is pinioned to the roller chain ahead of the article carrier in the direction of travel of the roller chain. Thus, when the article carrier and the guide arm 194 begin to turn around the sprockets on either end of the conveyor, the shortening of the distance of the chord between the connnection of the guide arm and the article carrier body to the roller chain will cause the carrier body to project forwardly in the direction of travel of the roller chain. This effect is shown in FIG. 10 showing an article carrier in phantom dashed lines progressing around the idler sprocket into position at the input of the conveyor to engage an overwrapped roll. This orientation of the article carrier, and thus the holding cup, toward the horizontal as it is about to engage a roll causes the engagement of the holding cups with the rolls to be relatively smooth. The leading edges of the holding cups will not dig into the sides of the roll, which could be the case if the cups were required to describe a perfect circular arc as they came upwardly into position to engage a roll. The article carriers, of course, describe a similar forwardly projecting motion as they enter the drive sprockets at the other end of the conveyor. However, at this end of the conveyor the chain guides 182 are bent away from the horizontal line of travel of the rolls before the article carriers enter the drive sprocket position, and thus smoothly fall away from the position of the roll while the ends of the roll itself are being engaged by the heat sealing conveyor belts 121. It may also be noted that at this point, the article carriers have been turned 90° so that the holding cups 104 are oriented transversely to the longitudinal line of motion of the rolls, and in this orientation the cups do not extend as far out longitudinally as they would if turned to their opposite position. The progress of the article carriers at the exit end of the indexing conveyors is also shown in phantom dashed lines in the view of FIG. 10.

Referring again to FIG. 12, the article carriers are maintained in their two opposite positions by the cooperation between a pair of selectively spaced notches 198 in the hub 191 with a cam follower roller 200 mounted on the end of a spring biased cam follower arm 201. The other end of the arm 201 is pivotally mounted to the article carrier body 190. A spring (not shown) biases the arm 200 so that the cam follower roller 200 is firmly held against the hub 191. As the holding cup and the hub 191 are rotated, the cam follower 200 is moved out of the first of the notches 198 and continues rolling along the peripheral surface of the hub 191 until it engages the other notch 198, at which point the holding cup is in its fully turned position. The spring loading of the roller 200 against the notches 198 tends to hold the holding cups in this position until the cups are forceably turned.

The turning of the holding cups is accomplished by a cam follower 205 which engages with the walls of cam grooves 206 and 207 formed respectively in the left and right hand index cams 187 and 188. The right hand groove 207 is simply the mirror image of the left hand groove 206 which is substantially as shown in FIG. 12 wherein the direction of motion is from left to right. As shown in FIG. 13, the cam follower roller 205 is rotatably mounted to a cam arm 208 which is itself rotatably mounted on a stud 209 attached to a collar portion 193 of the article carrier body. The cam follower arm 208 is also rigidly attached to and rotates with a wedge-shaped gear sector 210. The gear sector 210 is in meshed engagement with a gear 212 which is firmly mounted to a shaft 213 which extends through and rotates within the carrier body. The shaft 213 is rigidly attached for rotation to the holding cup hub 191. Thus, as the cam follower roller 205 is forced transversely as it progresses along through the cam groove 206, the gear 212 will be turned so as to rotate the holding cup 104 from a transverse to a longitudinal orientation thereof. An opposite rotation of the holding cup will occur when the cam follower enters the cam groove 207 of the right hand index cam 188.

Figure 14:
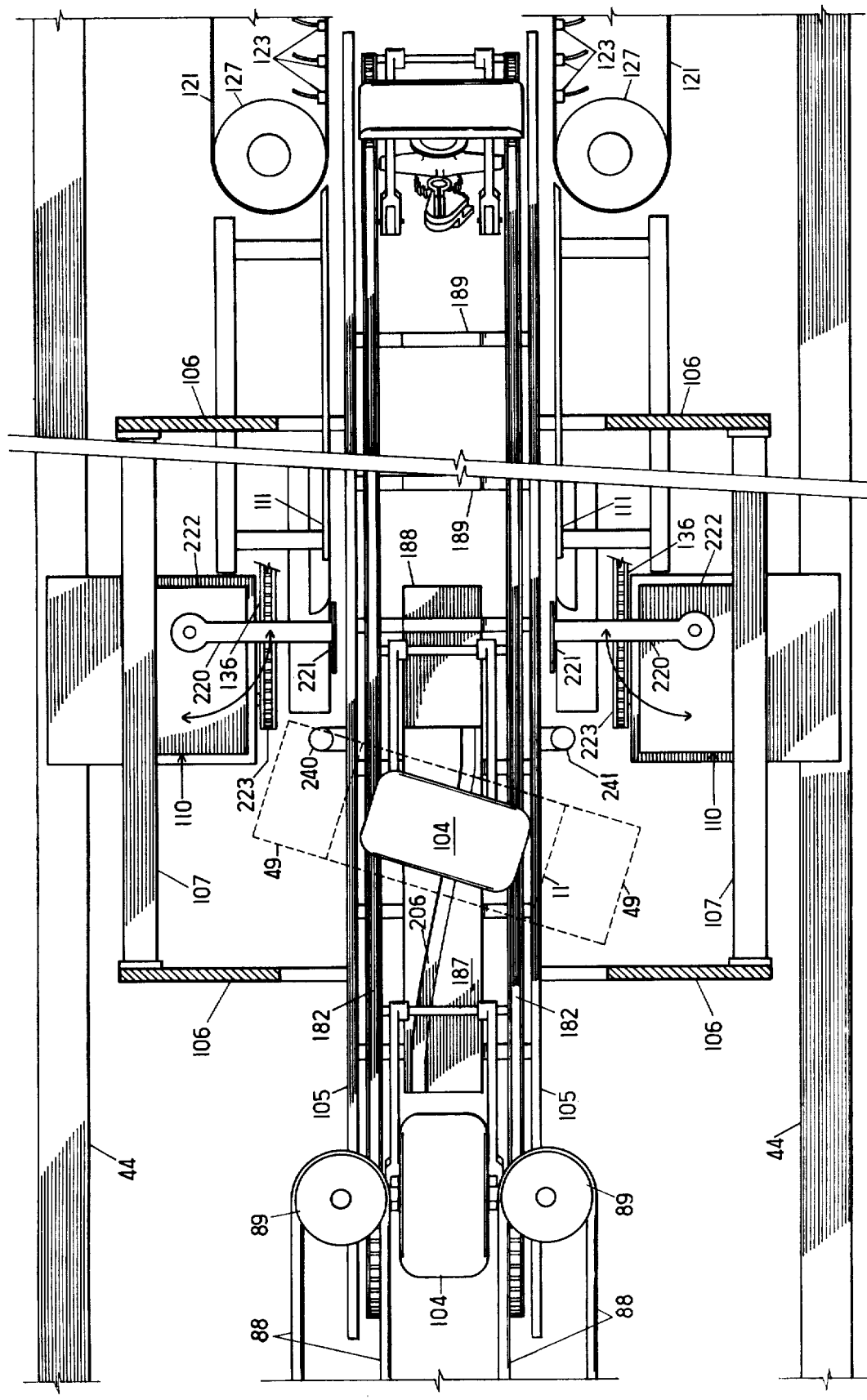
FIG. 14 is a cross-sectional view taken along the line 14—14 of FIG. 1B showing in somewhat simplified terms the operation of the tucking and folding mechanism in cooperation with the article carriers which move the overwrapped articles through the indexing conveyors.

The tucking and folding of the severed extending ends of the overwrap on the rolls is illustrated in the view of FIG. 14, which is a somewhat simplified view looking downwardly toward the lower indexing conveyor 102. As described above, the article carriers turn the overwrapped articles transversely to the direction of motion such that the cut ends of the overwrap extend to either side. As the product enters the region of the tuckers 110, a tucker arm 220, whose motion is synchronized with the travel of the article, is swung quickly toward the article such that a tucker plate 221 at the end of the tucker arm pushes the trailing portion of the extending severed ends inwardly toward the end of the roll. After a very short dwell at their inwardmost positions shown in FIG. 14, the tucker arms are quickly swung back to their rest positions so as not to interfere with the next incoming article. The forwardly moving roll then has the remainder of the outwardly extending wrapping pushed inwardly into engagement with the end of the roll by the stationary folding plows 111. The tuckers 110 are each driven by a tucker cam mechanism 222 which is driven by the drive chain attached to an input sprocket 223, which, as previously described, is driven from the gear box 132. The tucker cam mechanism is a standard product available for converting the continuous rotational motion applied to the input sprocket 223 into an intermittent motion of its output shaft connected to the tucker arm 220 in synchrony with the motion of the rolls.

The view of FIG. 14 illustrates the engagement of the heat sealing belts 121 with the folded ends of the overwrapped rolls. A series of electric heating elements 123 contact the belt 121, which may be teflon coated stainless steel, to heat the belt and the wrapped ends in contact with the belt.

The position of a roll is shown in dashed lines labeled 11 in FIG. 14, with the extending ends of the overwrap material also being shown in dashed lines labeled 49 in this figure. The actual rolls and overwrapping have not been shown in order to better illustrate the parts of the machine. It is apparent that in order for the extending ends of the overwrap to be properly closed about the roll, the roll itself must be substantially centered on the holding cups 104. The position of the roll in its transverse orientation is monitored by a pair of photo-electric cells 240 and 241 mounted just ahead of the tucker arms on either side of the path of the articles as they pass through the indexing conveyor. The light receiving aperture of the photo-electric cells is directed straight upward at a position just outwardly of the nominal end position of an article moving transversely through the indexing conveyors. A pair of cooperative light beam sources 242 directs a beam of light directly downwardly at the photo-electric cells such that if the roll held by the holding cups is displaced toward one side or the other, the light beam will be broken and the circuits through one or the other of the photo-electric cells will be interrupted. Interruption of the light beam to the photo-electric cell 241 indicates that the holding cups are engaging the article too far forwardly, whereas interruption of the light beam to the photo-electric cell 240 indicates that the holding cups are engaging the article late and therefore behind the center of the article. The first photo-electric cell 240 therefore provides a signal that indicates that the speed of the article carriers moving about the indexing conveyors must be advanced relative to the speed of incoming articles on the transfer conveyor 87. Conversely, an interruption signal from the second photo-electric cell 241 indicates that the speed of the article carriers on the indexing conveyor should be retarded.

The retarding or advancing of the speed of the indexing conveyors is controlled by a gear reducing motor 245 which drives a speed adjustment input shaft of the gear box 132. To allow adjustment of the speed of drive of the indexing conveyors, the gear box 132 is a commercially available double differential type which changes the input-output speed ratio as a function of incremental changes in the position of its speed adjustment input shaft as driven in steps by the gear reducing motor 245. As indicated above, both the indexing conveyors and the tucking mechanisms 110 are driven off the output shaft of the differential gear box 132 so that the motion of the tuckers will always remain in synchrony with the speed of the articles carried by the article carriers.

Figure 15:
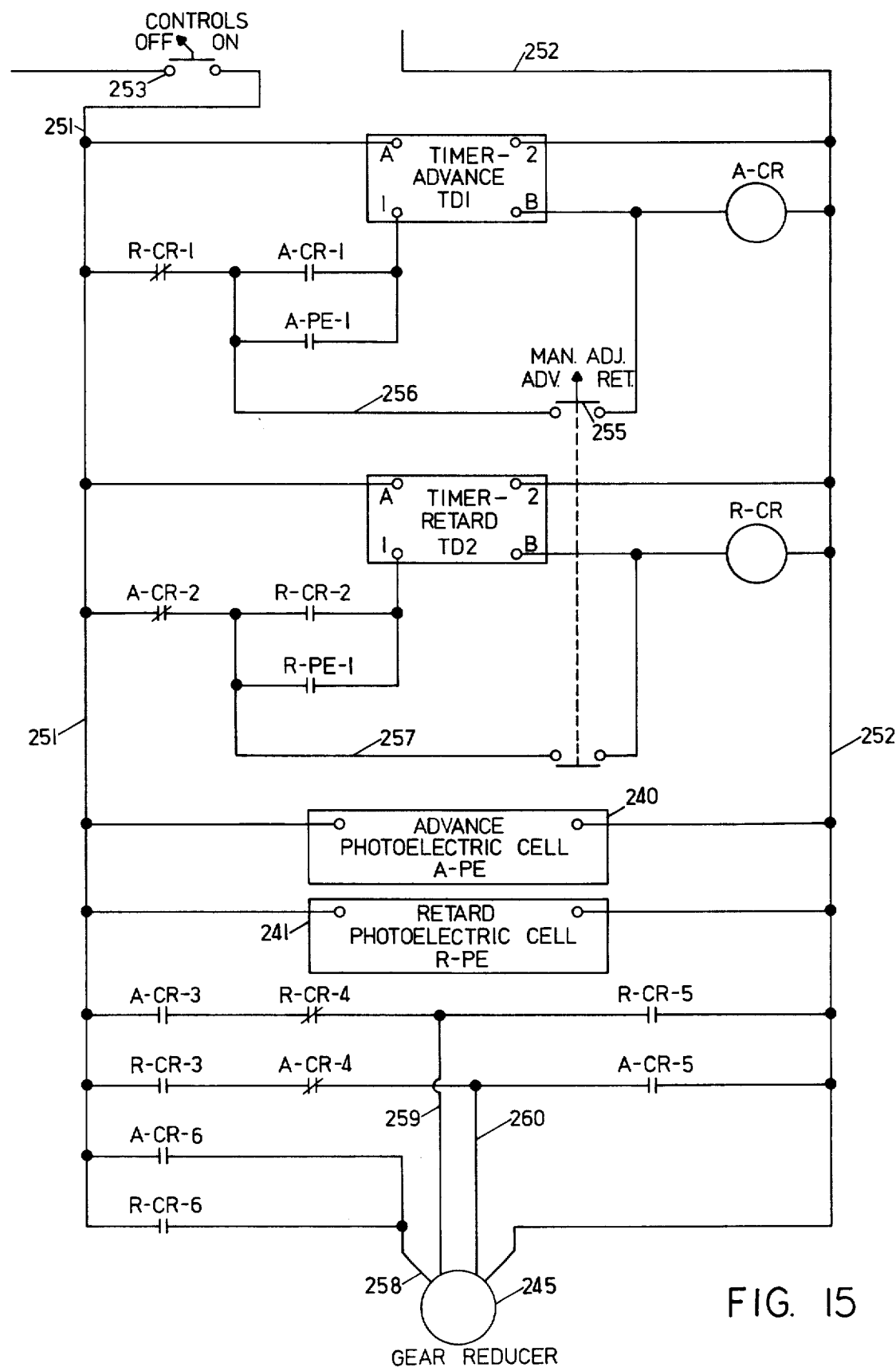
FIG. 15 is a schematic view of the electrical controls for monitoring the position of articles in the indexing conveyors.

The actuating controls for monitoring the position of the articles and providing a signal to drive the gear reducing motor are shown in FIG. 15 in schematic form. The controls are driven off of a high or hot line 251 provided with electric power from an AC source at line voltage, and includes a return line 252 at nominal ground. A manual off-on control switch 253 is positioned to allow an operator to selectively engage or disengage the monitoring controls. The photo-electric cell units 240 and 241 are electrically connected between the lines 251 and 252. Each of the units contains a photo-electric cell which controls a control relay coil within the unit such that the coil becomes activated upon interruption of light to the photo-electric cell. The relay coil in the advance photo-electric cell unit 240 is designated for purposes of description as relay coil A-PE, and the coil within the retard photo-electric cell 241 is designated as relay coil R-PE.

Since the photo-electric cells will be interrupted for a short time period that will not necessarily be uniform in length, proper timing of the control of the gear reducing motor is obtained by utilizing an advance time delay unit TD1 and a retard time delay unit TD2, both connected between the lines 251 and 252. Each time delay unit has input terminals labeled A and 1 and output terminals labeled B and 2. The time delay units are constructed to provide a connection between terminals A and B for a selected period of time after a pulse of power is provided between terminals 1 and 2. The advance timing unit TD1 is connected to receive power from the line 251 through normally closed relay contacts R-CR1 and the parallel connection of normally open relay contacts A-CR-1 and A-PE-1. Terminal B of the timing unit TD1 is connected to the low line 252 through a relay coil A-CR.

A similar retard time delay unit TD2 is connected across the lines 251 and 252. The time delay unit TD2 also has four terminals and is constructed to provide connection between terminals A and B for a preselected period of time after power is supplied between terminals 1 and 2 of the unit. The B terminal is connected through a relay coil R-CR to the ground line, while the terminal 2 is directly connected to the ground line. Terminal 1 is connected to the high line 251 through a normally closed relay contact A-CR-2 and the parallel combination of normally open relay contacts R-CR-2 and R-PE-1.

In order to provide manual adjustment of the position of the holding cups with respect to incoming articles, a manually adjustable three-position switch 255 is provided to selectively bypass the timing circuits in either the advance or retard mode. The switch 255 has a normal position in which both of the bypass lines are open. With the switch in its advance position, continuity is completed in a bypass line 256 which provides a direct connection from the normally closed relay contacts R-CR-1 to the relay coil A-CR. In its retard position, the switch provides continuity in a bypass line 257 running from the normally closed relay contacts A-CR-2 to the retard relay coil R-CR.

The gear reducing motor 245 is a two phase AC servo-motor which is reversible depending on the input provided to its control phase winding. The motor 245 has one terminal of its reference phase winding directly connected to the ground line 252 and the other reference phase terminal line 258 connected to the power line 251 through the parallel combination of normally open relay contacts A-CR-6 and R-CR-6. A first input line 259 is connected to the control phase winding such that, when it is provided with power from the high line 251, the motor will drive in its advance direction. The line 259 is connected to the power line 251 through normally open relay contacts A-CR-3 and normally closed relay contacts R-CR-4. The line 259 is also connected through normally open relay contacts R-CR-5 to the ground line 252 to provide a return line for the control phase when this winding is energized to provide the retard direction of motion of the motor. A second input line 260 is connected to the other terminal of the control phase winding and is connected to the power line 251 through normally open contacts R-CR-3 and normally closed contacts A-CR-4. The line 260 is also connected to ground through normally open relay contacts A-CR-5 to provide a return for the control phase winding when the motor 245 is driven in its advance direction.

As indicated above, the photo-electric cells will not energize their relay coils as long as they continue to receive an unbroken beam of light. Referring to the advance photoelectric cell 240, when the article is received in the article holders rearwardly of center, the circuit in the photo-electric cell unit 240 will be broken and its relay coil A-PE will be energized. Energization of this coil will close the normally open relay contacts A-PE-1 and thereby provide power to the input terminal 1 of advance timer unit TD1. The timer unit will immediately close contacts between terminals A and B to provide power to relay coil A-CR. All relay contacts labeled A-CR are then energized, including A-CR-1 which is closed to provide a parallel energization path with contacts A-PE-1 to the input terminal 1 of timer TD1. The timer is constructed such that after receiving even a momentary input signal between its terminals 1 and 2, it will provide contact between output terminals A and B for a preselected period of time during which the relay coil A-CR is energized. Closure of the relay contacts controlled by this relay coil provides power through the input line 258 to the reference winding of the motor 245, and through the input line 259 to the control winding of the motor to drive the motor in its advance direction for as long as the timing unit TD1 continues to supply power to the relay coil A-CR. The time that the timer TD1 is activated is selected such that the speed of the indexing conveyor is advanced in a small step, which will advance the position of the holding cups a few fractions of an inch forwardly with respect to the position of the articles being delivered by the transfer conveyor. An example, it has been found suitable to place the photoelectric cells 240 and 241 approximately 1/16th inch further apart than the normal length of the rolls, such that the beam of light to the cells passing through a transparent overwrap will be interrupted if the rolls are as little as 1/16 of an inch ahead or behind of the article carriers. The timer TD1 is on for a sufficiently short period of time such that the connection between its terminals A and B is broken before another article passes by the photo-electric cells 240 and 241. If the articles are still behind their proper centered position with respect to the article carriers, the photoelectric cell 240 will again energize its relay coil A-PE to close contacts A-PE-1 and energize the timer for another cycle. This process will be repeated in incremental steps until the incoming articles are centered. The steps by which the speed of the indexing conveyor is advanced with respect to the incoming articles is selected such that the dead zone of approximate centering of the articles is not overshot so that a dithering of the speed of the indexing conveyors does not occur.

In an entirely similar manner, an interruption of the light to the retard photo-electric cell 241 will cause energization of the relay contacts R-PE-1 to provide power to the timer TD2. The timer TD2 will therefore provide contact between its terminals A and B for a preselected period of time to energize the relay coil R-CR. Energization of this coil will activate all contacts labeled R-CR and in particular will provide power to the reference winding of the gear reducing motor through the line 258 and will provide power to the control phase input line 260 through relay contacts R-CR-3 and the normally closed relay contacts A-CR-4. The return of the control phase power will be through now closed relay contacts R-CR-5 to the ground line 252. As indicated above, the timing unit is set to drive the gear reducing motor for a short period of time to reduce the speed of the indexing conveyors in incremental steps, which process is repeated until the articles are centered within the dead zone between the photoelectric cells.

Manual centering is provided using the switch 255 during start-up and in other situations in which automatic centering is not possible. Activation of this switch in either the advance or retard direction completly bypasses the timing units and allows the speed of the machine to be advanced or retarded for as long as the operator determines is necessary.

It is understood that the invention is not confined to the particular embodiments herein illustrated and described, but embraces all such modified forms thereof as come within the scope of the following claims.

We claim:

1. Apparatus for wrapping articles with heat sealable material, comprising:
   (a) tube forming means for receiving a web of heat sealable material and forming the same into tubular form with the longitudinal edges of the material in overlapped relation;
   (b) article feeding means adapted to receive articles to be wrapped and for feeding the same in longitudinal alignment and selected spaced relation into the tube of heat sealable material formed by said tube forming means;
   (c) means for drawing the tubular formed material with the articles contained therein from said tube forming means;
   (d) a heat sealer positioned to heat seal the overlapped edges of the tubular formed material being drawn by said means for drawing comprising,
      (1) an endless heat sealing belt having perforations therein distributed over the length of said belt,
      (2) a belt carriage supporting said sealing belt for continuous motion with a portion of said sealing belt being linearly disposed and adapted for heat sealing contact with the overlapped edge portions of the tubular formed material,
      (3) means for directing heated air at a first position on the linearly disposed portion of said sealing belt to heat the material under said belt above the sealing temperature of the material by the heated air passing through the perforations in said belt,
      (4) means for directing cooling air at a second position on the linearly disposed portion of said sealing belt spaced in the direction of travel of said belt from said first position to cool the overlapped heat sealable material underneath said belt below the sealing temperature of the material,
      (5) means operatively associated with said belt carriage for driving said sealing belt in substantially synchronous contact with the overlapped tubular formed material during forward motion of the formed material;
   (e) means for severing the heat sealed tubular formed material substantially midway between adjacent articles to thereby leave overwrapped material about each article having open ends extending from the article;
   (f) indexing means for grasping the severed overwrapped articles, rotating the articles from a longitudinal to a transverse orientation, and transporting the overwrapped article longitudinally with the open severed ends of the wrapping extending transversely to the direction of travel;
   (g) means for tucking and folding the severed ends of the overwrapped material about each article as it is transported by said indexing means in a transverse orientation; and
   (h) means for heat sealing the tucked and folded ends of the overwrapped material about each article.

2. Apparatus for wrapping articles with heat sealable material, comprising:
   (a) tube forming means for receiving a web of heat sealable material and forming the same into tubular form with the longitudinal edges of the material in overlapped relation;
   (b) article feeding means adapted to receive articles to be wrapped and for feeding the same in longitudinal alignment and selected spaced relation into the tube of heat sealable material formed by said tube forming means;
   (c) means for drawing the tubular formed material with the articles contained therein from said tube forming means;
   (d) heat sealer means for forming a continuous heat seal between the overlapped longitudinal edge portions of the tubular formed material being drawn by said means for drawing;

(e) means for severing the heat sealed tubular formed material substantially midway between adjacent articles to thereby leave overwrapped material about each article having open ends extending from the article;

(f) a pair of indexing conveyors spaced apart to define a linear longitudinal path through which the overwrapped articles can be transported, each said indexing conveyor including,
  (1) a plurality of article carriers each having a holding cup adapted to engage a portion of the periphery of the overwrapped article,
  (2) means for supporting said article carriers for continuous motion about said indexing conveyors such that an article carrier on one of said indexing conveyors is in adjacent registered relation and moves in synchrony with an article carrier on the other of said indexing conveyors when said adjacent article carriers are supported along the linear path between said indexing conveyors, said holding cups of said adjacent article carriers being positioned to engage an overwrapped article between them after severing of the tubular formed material by said means for severing and to hold the overwrapped article during traverse of the linear path between said indexing conveyors,
  (3) means for turning said article carrier holding cups during traverse of the linear path between said indexing conveyors from a longitudinal orientation of said holding cup to a transverse orientation and for returning said holding cup back to a longitudinal orientation before said article carriers re-enter the linear path between said indexing conveyors, (g) means for tucking and folding the severed ends of the tubular overwrapped material extending from the articles held by said article carriers when said holding cups on said carriers are turned to a transverse orientation; and (h) means for heat sealing the tucked and folded ends of the tubular overwrapped material about each article.

3. The apparatus of claim 2 wherein said heat sealer means comprises:

(a) an endless heat sealing belt having perforations therein distributed over the length of said belt, (b) a belt carriage supporting said sealing belt for continuous motion with a portion of said sealing belt being linearly disposed and adapted for heat sealing contact with the overlapped edge portions of the tubular formed material, (c) means for directing heated air at a first position on the linearly disposed portion of said sealing belt to heat the material under said belt above the sealing temperature of the material by the heated air passing through the perforations in said belt, (d) means for directing cooling air at a second position on the linearly disposed portion of said sealing belt spaced in the direction of travel of said belt from said first position to cool the overlapped heat sealable material underneath said belt below the sealing temperature of the material, (e) means operatively associated with said belt carriage for driving said sealing belt in substantially synchronous contact with the overlapped tubular formed material during forward motion of the formed material.

4. Improved apparatus for wrapping articles with heat sealable material having means for receiving articles and feeding the same in selected spaced relation, means for overwrapping the articles with heat sealable material with the longitudinal edges of the heat sealable material overlapped and with the open ends of the material extending from the article, means for forming a heat seal between the overlapped edge portions of the heat sealable material about each article, means for tucking and folding the open ends of the overwrapped material about each article, and means for heat sealing the tucked and folded ends of the material, wherein the improvement comprises:

a pair of indexing conveyors spaced apart to define a linear longitudinal path through which the open ended overwrapped articles can be transported, each said indexing conveyor including:

(a) a plurality of article carriers each having a holding cup adapted to engage a portion of the periphery of the overwrapped article;

(b) means for supporting said article carriers for continuous motion about said indexing conveyors such that an article carrier on one of said indexing conveyors is in adjacent registered relation and moves in synchrony with an article carrier on the other of said indexing conveyors when said adjacent article carriers are supported along the linear path between said indexing conveyors, said holding cups of said adjacent article carriers being positioned to engage and hold an overwrapped article between them during traverse of the linear path between said indexing conveyors;

(c) means for turning said article carrier holding cups during traverse of the linear path between said indexing conveyors from a longitudinal orientation of said holding cup to a transverse orientation and for returning said holding cup back to a longitudinal orientation before said article carriers re-enter the linear path between said indexing conveyors;

said means for tucking and folding being positioned to tuck and fold the overwrapped material extending from articles carried by said article carriers when said holding cups on said carriers are turned to a transverse orientation, and said means for heat sealing the ends of the material being positioned to engage the tucked and folded ends of the heat sealable material on articles carried by said holding cups, whereby overwrapped articles have the extending ends of the wrapping thereon are tucked, folded and heat sealed in continuous linear longitudinal motion.

5. The apparatus of claim 1 or 3 including means for controlling the temperature of the heated air being directed at said first position on said sealing belt so as to be substantially proportional to the speed of motion of said belt.

6. The apparatus of claim 1 or 3 including a heat sealer mounting post to which said belt carriage is rotatably mounted, and further including means operatively associated with said belt carriage for maintaining said heat sealing belt in contact with the overlapped edges of the heat sealable material during forward motion of the material, and for rotating said belt carriage about its rotatable mounting to said post upwardly and away from contact of the sealing belt with the heat sealable material when forward motion thereof has ceased to thereby prevent said sealing belt from unintentionally melting the heat sealable material when the apparatus is shut down.

7. The apparatus of claim 1 or 3 wherein said heat sealing belt comprises an endless belt formed of flexible stainless steel coated on its outer surface with tetrafluoroethylene polymer to inhibit sticking of the heat sealable material to said outer surface.

8. The apparatus of claim 1 or 3 wherein said belt carriage includes a carriage plate, a pair of pulleys rotatably mounted to opposite ends of said carriage plate, said heat sealing belt being mounted around said pulleys for rotation therewith, and a tensioning roller mounted by a rotatable arm to said carriage plate and spring biased against said sealing belt to maintain said belt in substantially constant tension, the linearly disposed portion of said heat sealing belt being defined between the bottom tangents to said pulleys opposite the position of said tensioning roller.

9. The apparatus of claim 6 including a machine frame to which said mounting post is mounted, wherein said means for maintaining said sealing belt in contact with the heat sealable material includes a drive arm connected to said belt carriage, and a pneumatic cylinder operably attached between said machine frame and said drive arm to selectively rotate said belt carriage to move said sealing belt into and out of engagement with the heat sealable material as air under pressure is selectively applied to said pneumatic cylinder.

10. The apparatus of claim 1 or 3 wherein said means for directing hot air at said heat sealing belt includes a nozzle with a slot therein running in the same direction as said heat sealing belt and disposed adjacent to said belt such that air passing through said nozzle will pass through the perforations in said belt, an air heater receiving air under pressure and heating it above the heat sealing temperature of the heat sealable material, the heated air therefrom being directed to said first nozzle, and further including at least one valve mounted to said first nozzle and being controllable to vent hot air to the atmosphere to reduce the volume of hot air directed to said belt.

11. The apparatus of claim 1 or 3 wherein said means for drawing the tubular formed material with the articles contained therein includes three endless friction belts mounted for movement in evenly spaced relation about the periphery of the tubular formed material with each said friction belt having a linearly disposed portion in position to make contact therewith, and further including means for driving said friction belts in contact with the tubular formed material to thereby apply longitudinal tension to the material and draw the same forwardly from said tube forming means.

12. The apparatus of claim 1 or 2 wherein said means for severing the sealed tubular formed material includes a cut-off knife having a cutting edge comprising a series of sharply pointed serrations adapted to pierce the tubular heat sealable material at each point and pass smoothly through the tubular material without collapsing the same, and further including means operably connected to said cut-off knife to pass said cut-off knife across the sealed tubular formed material in synchronism with the rate at which articles are supplied so as to sever the tubular formed material at a position substantially midway between adjacent articles.

13. The apparatus of claim 2 or 4 wherein said means for supporting said article carriers for continuous motion on each of said indexing conveyors include, (a) an indexing conveyor frame;
(b) a pair of laterally spaced drive sprockets and a pair of laterally spaced idler sprockets, each pair of sprockets being rotatably mounted to said indexing conveyor frame in longitudinal spacing from the opposite pair;
(c) a pair of endless roller chains each engaged between one of said drive sprockets and idler sprockets;
(d) chain guide means for maintaining said roller chains in desired alignment between said idler and drive sprockets;
(e) means for rotating said drive sprockets;
(f) means for mounting said article carriers between said pair of roller chains such that said article carrier holding cups extend outwardly from said roller chains.

14. The apparatus of claim 13 wherein said article carriers each include,
(a) an article carrier body pivotally mounted between said roller chains, said holding cup being mounted to said article carrier body;
(b) a guide bracket attached to said article carrier body; and
(c) a guide arm pivotally attached at one end to said guide bracket and at the other end to said roller chains at a position ahead of said article carrier body in the direction of its travel, whereby as each said article carrier passes around said indexing conveyor sprockets, said holding cup will be tilted forwardly in the direction of travel because of the shortening of the chord between the attachment of said carrier body and guide arm to said roller chains.

15. The apparatus of claim 14 wherein said holding cup is mounted to a shaft rotatably mounted in said article carrier body, and wherein said means for turning each of said holding cups during traverse of said indexing conveyors includes,
(a) a cam follower having a cam follower roller, mounted to said carrier body and engaged with said shaft therein to rotate the same when said cam follower roller is displaced;
(b) a first cam mounted beneath said roller chains and having walls therein defining a cam groove which are positioned to engage said cam follower roller when said article carrier is traversing the linear path between said indexing conveyors, said cam groove being shaped to displace said cam follower roller laterally such that said holding cup is rotated from a longitudinal to a transverse orientation;
(c) a second cam mounted beneath said roller chains and having walls therein defining a cam groove which are positioned to engage said cam follower roller when said article carrier is returning on the side of said indexing conveyor away from the linear path between said indexing conveyors, said cam groove being shaped to displace said cam follower roller such that said holding cup is rotated from a transverse to a longitudinal orientation.

16. The apparatus of claim 2 including transfer conveyor means, positioned between said means for severing the tubular formed material and said pair of indexing conveyors, for engaging a severed overwrapped article and transferring the same longitudinally to a position where it can be engaged by said holding cups of said indexing conveyors.

17. The apparatus of claim 4 wherein the improvement further comprises transfer conveyor means positioned to engage a heat sealed open ended overwrapped article and for transferring the same longtudinally to a position where it can be engaged by said holding cups of said indexing conveyors.

18. The apparatus of claim 16 or 17 including monitoring means for monitoring the position of articles held by said article carriers in transverse orientation and providing a control signal indicating when articles are held off-center in said holding cups, and further including differential speed drive means responsive to the control signal from said monitoring means for retarding or advancing in selected increments the speed at which said article carriers move relative to overwrapped articles from said transfer conveyor means so as to progressively center the overwrapped articles in said holding cups.

19. The apparatus of claim 18 wherein said monitoring means includes a pair of cooperative photo-electric cells and light beam sources, one each of said photo-electric cells and light sources being positioned on either side of the path of overwrapped articles carried in transverse orientation by said indexing conveyors such that an article displaced transversely from center in said holding cups will interrupt the light beam to the photo-electric cell on the side to which the article is displaced to provide an electrical signal from the photo-electric cell.

20. The apparatus of claim 16 wherein said transfer conveyor means comprises:
 (a) two pair of ring belts,
 (b) means for mounting each pair of ring belts in laterally spaced relation in position to engage opposite sides of an overwrapped article passing from said means for drawing the tubular formed material, said ring belts being mounted to extend longitudinally to said indexing conveyors;
 (c) means for driving said ring belts in synchrony to transfer a severed overwrapped article to said indexing conveyors; and
 (d) said means for severing being positioned between said means for drawing the tubular material and said transfer conveyor means so as to sever the sealed tubular material after said ring belts have engaged the preceding overwrapped article.

21. The apparatus of claim 1 or 2 wherein said article feeding means includes,
 (a) a rotatably mounted star wheel having diagonally extending flanges adapted to receive a single article to be wrapped between them;
 (b) means for rotating said star wheel when an article has been received between said flanges thereof to drop the article downwardly while blocking the passage into the star wheel of incoming articles;
 (c) a spacing conveyor mounted beneath said star wheel in position to receive an article dropped by said star wheel, said spacing conveyor having at least one transversely disposed bar mounted for forward movement, said bar engaging an article dropped by said star wheel and pushing thhe same forward in selected spaced relation to the preceding article;
 (d) a guide tube having a split top defining a slot therein, positioned to receive articles from said spacing conveyor;
 (e) a timing conveyor including a pusher lug extending through the slot in said guide tube to engage an article, and a mounting conveyor for said pusher lug for driving the same through said guide tube slot to push an article in longitudinal alignment and selected spaced relation with preceding articles into the tubular formed material.

22. The apparatus of claim 1 or 2 wherein said means for heat sealing the tucked and folded ends of the overwrapped material includes a pair of transversely opposed endless heat conductive belts mounted for driven movement in position to engage a tucked and folded overwrapped article between them as the article reaches the end of said transfer conveyors and is released by said holding cups.

23. The apparatus of claim 2 including means for selectively advancing or retarding the speed of motion of said article carriers about said indexing conveyors, whereby the speed of motion of said article carriers relative to overwrapped articles received between adjacent article carriers may be adjusted so that the overwrapped articles are substantially centered in said holding cups of said adjacent article carriers.

24. The apparatus of claim 4 wherein the improvement further comprises means for selectively advancing or retarding the speed of motion of said article carriers about said indexing conveyors, whereby the speed of motion of said article carriers relative to overwrapped articles received between adjacent article carriers may be adjusted so that the overwrapped articles are substantially centered in said holding cups of said adjacent article carriers.

25. Apparatus for wrapping articles with heat sealable material, comprising:
 (a) tube forming means for receiving a web of heat sealable material and forming the same into tubular form with the longitudinal edges of the material in overlapped relation;
 (b) article feeding means adapted to receive articles to be wrapped and for feeding the same in longitudinal alignment and selected spaced relation into the tube of heat sealable material formed by said tube forming means;
 (c) means for drawing the tubular formed material with the articles contained therein from said tube forming means;
 (d) heat sealer means for forming a continuous heat seal between the overlapped longitudinal edge portions of the tubular formed material being drawn by said means for drawing;
 (e) means for severing the heat sealed tubular formed material substantially midway between adjacent articles to thereby leave overwrapped material about each article having open ends extending from the article;
 (f) indexing means for grasping the severed overwrapped articles, rotating the articles from a longitudinal to a transverse orientation, and transporting the overwrapped article longitudinally with the open severed ends of the wrapping extending transversely to the direction of travel;
 (g) means for selectively advancing or retarding the speed of said indexing means relative to overwrapped articles received by said indexing means such that speed of said indexing means and the speed of incoming articles can be substantially synchronized;
 (h) means for tucking and folding the severed ends of the tubular overwrapped material about each article as it is transported by said indexing means in a transverse orientation; and
 (i) means for heat sealing the tucked and folded ends of the tubular overwrapped material about each article.

* * * * *